US011933157B2

(12) United States Patent
Dunbar et al.

(10) Patent No.: US 11,933,157 B2
(45) Date of Patent: Mar. 19, 2024

(54) SYSTEM AND METHOD FOR COMMUNICATING WITH A DOWNHOLE TOOL

(71) Applicant: HALLIBURTON ENERGY SERVICES, INC., Houston, TX (US)

(72) Inventors: Bradley David Dunbar, The Woodlands, TX (US); John Leslie Wisinger, Jr., Spring, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 286 days.

(21) Appl. No.: 17/311,604

(22) PCT Filed: Jan. 7, 2019

(86) PCT No.: PCT/US2019/012551
§ 371 (c)(1),
(2) Date: Jun. 7, 2021

(87) PCT Pub. No.: WO2020/145940
PCT Pub. Date: Jul. 16, 2020

(65) Prior Publication Data
US 2022/0018239 A1    Jan. 20, 2022

(51) Int. Cl.
*E21B 44/00* (2006.01)
*E21B 47/18* (2012.01)

(52) U.S. Cl.
CPC .............. *E21B 44/00* (2013.01); *E21B 47/18* (2013.01)

(58) Field of Classification Search
CPC ................................ E21B 44/00; E21B 47/18
See application file for complete search history.

(56) References Cited

U.S. PATENT DOCUMENTS

| | | | |
|---|---|---|---|
| 2007/0205022 A1* | 9/2007 | Treviranus | E21B 7/06 175/77 |
| 2008/0216568 A1 | 9/2008 | Jeffryes | |
| 2011/0011594 A1 | 1/2011 | Young et al. | |
| 2015/0083410 A1* | 3/2015 | Steele | E21B 47/024 166/255.3 |
| 2016/0130937 A1 | 5/2016 | Logan et al. | |
| 2016/0230546 A1 | 8/2016 | Braisher et al. | |
| 2016/0290128 A1 | 10/2016 | Dugas | |
| 2018/0371901 A1 | 12/2018 | Lakings et al. | |

OTHER PUBLICATIONS

International Search Report and Written Opinion, PCT Application No. PCT/US2019/012551, dated Oct. 7, 2019.

\* cited by examiner

*Primary Examiner* — Dany E Akakpo
(74) *Attorney, Agent, or Firm* — Polsinelli PC

(57) ABSTRACT

Transmitting and receiving mud pulse pressure waves at a downhole device. The mud pulse pressure waves may be transmitted from a surface mud pulser and/or by a downhole mud pulser to a downhole device. The mud pulse pressure waves may be detected directly by a transducer or indirectly by detecting physical changes induced in the downhole tool by the pressure waves of the mud pulse. The detected physical changes can be converted to a digital signal for use by the downhole tool. The mud pulse pressure waves may encode information including data, or instructions to the downhole devices.

15 Claims, 6 Drawing Sheets

SYSTEM AND METHOD FOR COMMUNICATING WITH A DOWNHOLE TOOL

CROSS-REFERENCE TO RELATED APPLICATIONS

This application is a national stage entry of PCT/US2019/012551 filed Jan. 7, 2019, said application is expressly incorporated herein by reference in its entirety.

TECHNICAL FIELD

The present application is generally directed to communicating with a downhole tool.

BACKGROUND

Downhole drilling operations often require information collected during drilling to be shared with the surface. Drilling devices may share data regarding downhole conditions or rock formations which may be collected via logging-while-drilling (LWD) and measure-while-drilling (MWD) systems. One of the most common methods for sharing MWD and LWD data with the surface includes mud pulse telemetry, where mud pulses are generated by a pulser which are transmitted to the surface and decoded for use.

In addition to communication with the surface, various downhole devices along a drilling device may require communication with another, such as to transmit control instructions or share data. Often this communication between downhole devices is carried out using physical wiring. Such communication via wiring may require the additional components such as the use of connections or power units.

BRIEF DESCRIPTION OF THE DRAWINGS

Embodiments of the present application are described, by way of example only, with reference to the attached Figures, wherein.

DETAILED DESCRIPTION

Figure 1:
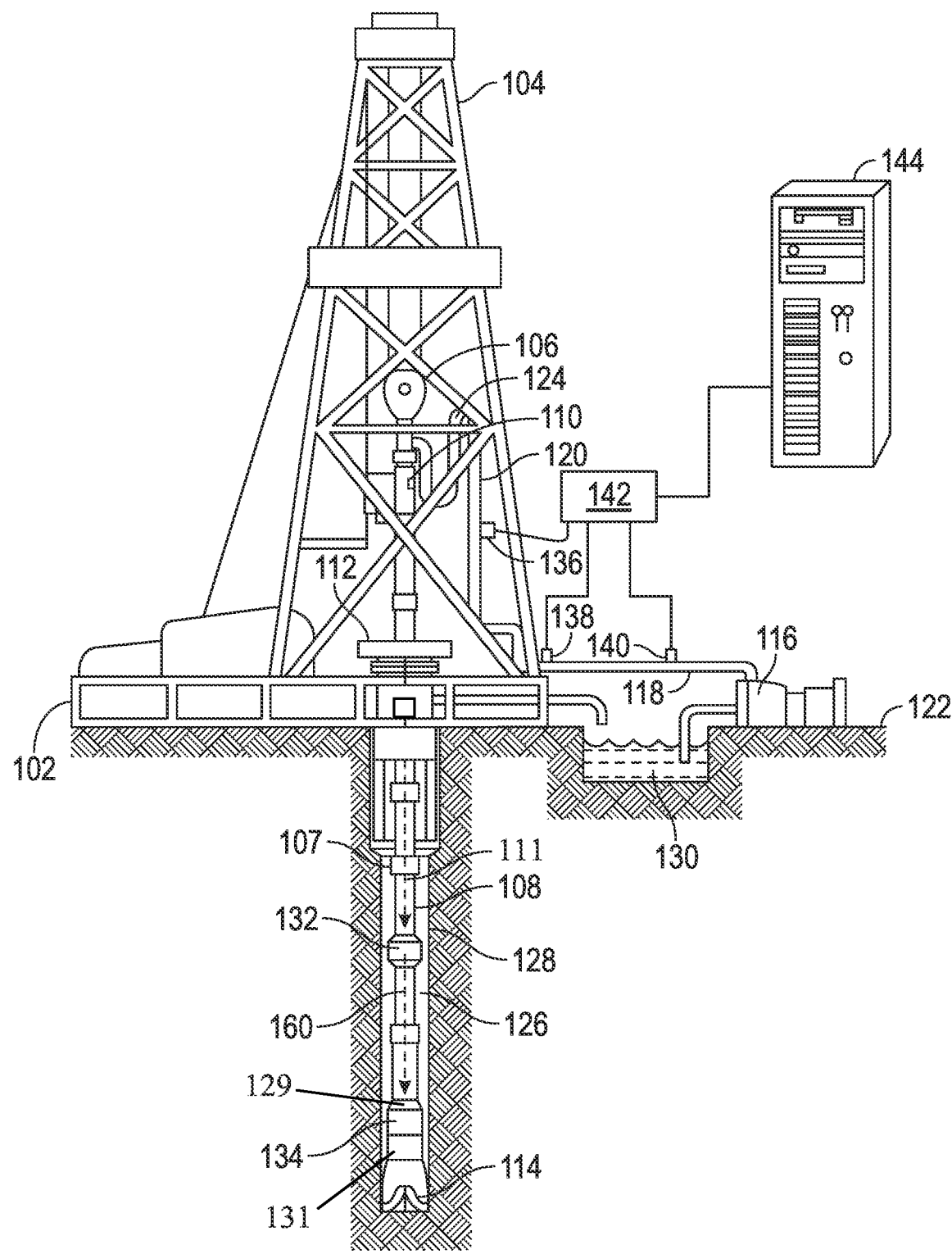
FIG. 1 is a schematic view of a wellbore operating environment, according to various embodiments of the subject technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

It should be understood at the outset that although illustrative implementations of one or more embodiments are illustrated below, the disclosed compositions and methods may be implemented using any number of techniques. The disclosure should in no way be limited to the illustrative implementations, drawings, and techniques illustrated herein, but may be modified within the scope of the appended claims along with their full scope of equivalents.

Disclosed herein are systems and methods for detecting a mud pulse by a downhole device and converting the mud pulse into a digital signal. The digital signal may include information such as data or instructions to actuate or control a downhole device. Conventional mud pulse systems have been generally used to transmit information to the surface. However, it is recognized herein that pressure waves formed by a pulser device propagate both above and below the mud pulser. Accordingly, as disclosed herein, mud pulse telemetry may not only be used to communicate information to the surface, but additionally from the surface to downhole devices, and between downhole devices.

A sensor may be coupled with the downhole device which may indirectly detect the pressure waves of a mud pulse. In particular, pressure waves made by the mud pulser perturb or induce physical changes in the downhole device. The physical changes induced by the pressure wave can be detected by the sensors coupled with the downhole device. These detected physical changes are then converted by a processor into a digital signal containing data or control instructions for the downhole device. Such physical changes include, but are not limited to, a change in the rotation of a drill bit, a change in a flow rate of a fluid in the downhole tool, a change in a speed of a motor in the downhole tool, and/or a change in the torque of the motor in the downhole tool. Accordingly, downhole sensors which may be used for detecting the pressure waves from the mud pulser for conversion into interpretable digital signal include, but are not limited to gyroscopes, accelerometers, magnetometers, flow rate sensors, and/or torque sensors. In particular, any device or sensor may be used which is capable of detecting changes induced in a downhole device by pressure waves of a mud pulse. As described, the pressure wave from a mud pulse induces physical changes in rotation rate of a drill bit, such as by speeding up or slowing down the rotational rate, which may be detectable by accelerometers, magnetometers, and/or gyroscopes. Flow rate sensors may be used to measure changes in flow rate induced by pressure waves traversing the fluid medium. Torque sensors may be used to detect changes in rotational force of the motor result from speeding up and/or slowing down the motor induced by a pressure wave from a pulser. Any downhole device and sensor may be used for indirectly detecting the pressure waves of the mud pulse.

While sensors may be added to a downhole device, for convenience, devices already present in a downhole device may be employed. By using devices and sensors already present in a downhole device, such as a drill string, additional modifications to standard devices need not be carried out. This economy is beneficial especially in view of limitations on space which are present downhole which can make modifications difficult. Additionally, wiring which would otherwise be required for such communication may be omitted. Moreover, information can be transmitted to devices which do not ordinarily receive mud pulse communication, such as drill bits, or devices below the motor of a drill string.

Further, the present disclosure encompasses the direct detection of pressure waves of a mud pulse via pressure transducers. Pressure transducers may also be included below the motor of a drill string. However, as discussed above, the addition of transducers can be omitted in view of indirect detection of pressure waves of a mud pulse. While pressure transducers may be provided along the drill string to directly detect pressure waves from the mud pulser, any downhole device capable of detecting a pressure wave directly or indirectly may be suitably employed.

Accordingly, as disclosed, herein mud pulse telemetry may not only be used to communicate information to the surface, but additionally to and between devices above and below the mud pulser along a downhole device, such as a drill string, including other devices below the motor and at the drill bit. A mud pulser can be provided at the surface and/or downhole. The downhole mud pulser can receive information in a variety of ways from the surface or other downhole devices, and so may include or otherwise be communicatively coupled with a downhole receiver.

Therefore, when the surface communicates to the downhole mud pulser, it may transmit to the downhole receiver of the downhole mud pulser. Information from the surface may be encoded into a mud pulse pressure wave, or if by acoustic telemetry then into an acoustic wave, and transmitted from the surface to the downhole receiver of the downhole mud pulser. The downhole receiver may receive a pressure wave or acoustical wave and convert this into a digital signal. The information from the surface by itself, or combined with information from other downhole devices, may be again encoded into a pressure wave by the downhole mud pulser and transmitted to another downhole device, such as the drill bit or other downhole device above or below the motor or above or below the downhole mud pulser. Alternatively, or additionally, the mud pulser at the surface may transmit to a downhole device directly without being received and re-transmitted by a downhole pulser.

In addition to information from the surface, downhole devices may communicate a digital signal to the receiver of the downhole mud pulser via wire, fiber optic, or wirelessly via electromagnetic wave. The downhole mud pulser may then encode this into mud pulse pressure waves for transmission to other downhole devices.

Therefore, the information from the surface may be sent to a downhole pulser, where it may be combined with information from downhole devices, such as logging data from LWD and MWD systems, which may then be transmitted by the downhole pulser to a downhole device along the drill string, such as the drill bit. Additionally, downhole devices may communicate information to one another directly via the downhole mud pulser without mixing information with the surface. Furthermore, information from multiple downhole devices may be combined and transmitted via the downhole pulser.

Information may be initially provided from a processor at the surface in digital form to a surface mud pulser where it is encoded into a pressure wave and transmitted to the downhole mud pulser. The downhole mud pulser may then transmit to a downhole device, such as a drill bit. For example, information encoded at the surface may be converted from a digital signal representation into an instruction set for producing a corresponding pulse sequence by the downhole mud pulser. The instruction set may then be transmitted to the downhole mud pulser in order for the mud pulser to execute the instruction set and transmit the encoded information to a downhole device via pressure waves. The pressure waves are detected, directly or indirectly as described herein, by the downhole device and converted] from pressure waves to a digital signal for execution by the downhole device.

The information transmitted by the pressure waves and converted to a digital signal at a downhole device may include control instructions. For instance, a control instruction may include commands regarding rotation rate or pitch for a drill bit. For example, and without limitation, control instructions can be sent to the drill bit to direct actuatable features installed on the drill bit such as extending the gauge pad, adjusting flow through the nozzle, extending and/or retracting the depth of cut. Rotational sensors may detect the physical changes induced by pressure waves of the mud pulse, and may be coupled to a processor and/or memory storing instructions for receiving and decoding signals.

The digital signal converted from the pressure waves may initially include noise due to the surrounding borehole environment, other acoustic-based tools in the vicinity, surface noise reverberating through the ground, and from various other sources as will be apparent to a person having ordinary skill in the art. The digital signal may be preprocessed in order to remove or dampen any noise and so identify the information content of the signal Preprocessing such as noise reduction can include a low-pass filter having a predetermined frequency set to just above the frequency of the transmitted message. In particular, the low-pass filter removes signals or signal portions above the predetermined frequency. As a result, higher frequency noise can be removed from the received signal in order to further isolate the transmitted information content. In some examples, noise resistant encoding can be applied such as Hamming codes, which are error-detecting codes. For instance, a chip rate, which may be the digital signal frequency, can be applied based on Barker codes, which provide an autocorrelation function. The combination of noise resistant encoding along with a predetermined chip rate can provide further protection against noise in the transmission.

Furthermore, the disclosure herein provides for mud pulse telemetry to communicate with any downhole device, such as a drill string, or devices along the drill string, including the drilling device, drill bit, LWD and MWD components, stabilizers, directional devices, anti-rotation devices, the motor, or other devices.

FIG. 1 is a schematic view illustrating an example subterranean well that may be used in accordance with the present disclosure. Shown therein is a drilling platform 102 which is equipped with a derrick 104 that supports a hoist 106. A string of drill pipes are connected together by tool joints 107 so as to form a drill string 108. The hoist 106 suspends a top drive 110 that can rotate the drill string 108 and lower the drill string through the wellhead 112. Connected to the lower end of the drill string 108 is a drill bit 114 that has been advanced into the earth from surface 122 in order to form wellbore 128. The drill bit 114 can be located at a bottom, distal end of the drill string 108. Drilling fluid (also referred to as "mud") can be pumped by mud pump 116 through flow line 119, stand pipe 120, goose neck 124, top drive 110, and down through the drill string 108 at high pressures and volumes. The drilling fluid can then travel back up the wellbore 128 via the annulus 126 formed between the exterior of the drill string 108 and the wall of wellbore 128. At the surface 122, the drilling fluid can exit the annulus 126 and drain into a mud pit 130 on the surface 122. On the surface 122, the drilling fluid can be cleaned and recirculated down the drill string 108 by mud pump 116. Flow rate sensors may be provided along the drill string 108 so to measure the flow rate of the drilling fluid.

As shown in FIG. 1, the drill string 108 can support several components along its length. In wells employing measurement while drilling (MWD)/logging while drilling (LWD), a sensor unit 134 can collect data regarding the formation properties and/or various drilling parameters near the drill bit 114. The collected data can include such properties as formation fluid density, temperature, pressure, resistivity, porosity, and azimuthal orientation of the drill bit 114 or drill string 108. Furthermore, the sensor unit can contain one or more transducers for measuring the pressure within the drill string 108. Other units can be disposed along the drill string 108 which can be similarly enabled to sense nearby characteristics and conditions of the drill string 108, formation fluid, and surrounding formation.

Data indicative of downhole conditions and characteristics can be sensed by the sensor unit 134 and sent up to the surface either by mud pulse telemetry, wire, wirelessly or otherwise. Power for sensor units and/or communication modules may be provided by batteries housed therein or generated from the flow of drilling mud through the drill string 108 using turbines as is known in the art.

An orienting sub 129 may be provided above the motor 131 which may be used to control the drilling direction of the drill bit 114. The orienting sub 129 may be for instance a bent sub or a rotary steerable system. In addition to, or alternatively to the top drive 110, a motor 131 can be provided below the sensor unit 134 and above the drill bit 114. The motor 131 may be a mud motor which is driven by the mud pumped by mud pump 116. The motor 131 may include a stator and rotor contained within the drill string where the drilling fluid rotates the rotor within the stator causing a drilling shaft and drill bit 114 end to rotate. The top drive 110 may rotate the drill bit 114, or alternatively, the motor 131 provides rotation to the drill bit 114, or both may be used. Torque sensors may be provided with the top drive 110 and/or the motor 131 which may indicate the rotational force provided by the motor 131.

Additional sensors may be included below the motor 131 and above just above the drill bit 114, or may be integrated with the drill bit 114. Such sensors may include one or more gyroscope and accelerometers, and may be used for independently, or semi-independently, for the drill bit 114 to control its own drill speed and direction.

A mud pulser 132 can modulate the resistance to the incoming flow of drilling fluid to generate pressure pulses (positive/negative pulse systems) or a carrier frequency (continuous wave pulse system) that propagate up to the surface 122 and also down channel 160 to sensor 134 and/or drill bit 114. At the surface 122, various transducers, such as transducers 136 and/or 140 can convert the pressure signal traveling upwards into electrical signals for a signal digitizer 142, which may be an analog to digital converter. While two transducers 136, 140 are illustrated at specific locations, a greater or fewer number of transducers may be used and may be disposed at different locations of the surface 122 or within the wellbore 128. The digitizer 142 supplies a digital form of the pressure signals to one or more processors 144 or some other data processing device. Processor 144 operates in accordance with software (which may be stored on a computer-readable storage medium) to process and decode the received signals.

Processor 144 operates to send signals 111 downhole to mud pulser 132 or directly to other downhole devices such as the drill bit 114. Signals 111 may include information from the surface, such as data or control instructions to a downhole device. The processor 144 may transmit signals 111 to the mud pulser 132 according to software for controlling and encoding messages to be transmitted downhole. Accordingly, signals 111 may be pressure waves, acoustic waves, electromagnetic waves, or transmitted via wire or fiber optics. For instance, the processor 144 may cause mud pulser 138 to send signals 111 to the mud pulser 132 to generate pressure waves, which are then transmitted to other downhole devices such as drill bit 114. Accordingly, information as a digital signal from the processor 144 may be converted into a mud pulse by mud pulser 138 thereby encoding the information into pressure waves. Additionally, or alternatively, signals 111 may also be encoded by processor 144 as acoustic waves for acoustic telemetry, or may be sent via wire to mud pulser 132 for re-transmission to other downhole devices. The mud pulser 132 may also receive information, such as MWD or LWD data or control instructions, from the sensors 134 and transmit via mud pulse pressure waves to other downhole devices, such as drill bit 114. The mud pulser 132 may receive and combine the information from processor 144 at the surface 122 along with information from sensors 134 and transmit to other downhole tools. Accordingly, mud pulser 132 may have a receiver for receiving information from other downhole devices such as sensors 134 in any wireless or wired form, mud pulse, acoustic wave, electromagnetic waves, electromagnetic waves, wire, or fiberoptics.

The drill bit 114 can include one or more processors and memory for controlling drill speed, orientation, and other characteristics of drilling. The processors and memory of the drill bit 114 can also receive drilling environment and characteristic information from sensors 134 or sensors integrated with the drill bit, such as actual drilling speed, orientation, torque, acceleration. As described herein the drill bit 114 may receive pressure waves from mud pulser 132. Processors within the drill bit 114 may process the received drilling environment and characteristic information in order to identify information, including data and/or control commands and instructions encoded into pressure waves generated by the mud pulser 132 or mud pulser 138. The mud pulser 132 may be transmitting such pressure waves according to signals transmitted to it from the processor 144 at the surface 122. As a result, the drill bit 114 can be directly controlled from the surface 122 via encoded mud pulses and without requiring wiring around the mud pulser 132 or installing costly and/or fragile wireless transmission modules along the drill string 108.

Figure 2:
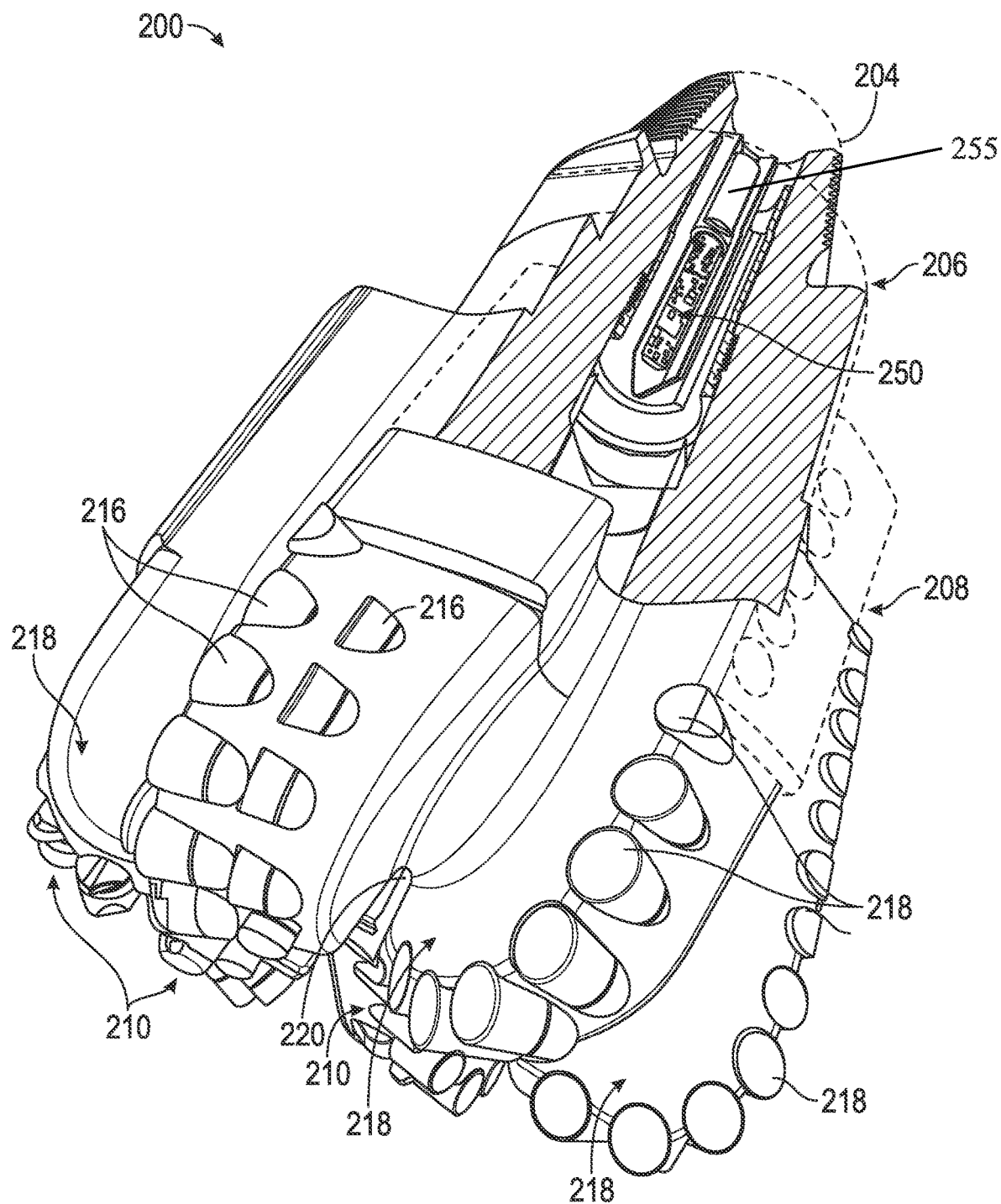
FIG. 2 is a cross-sectional view of a drill bit, according to various embodiments of the subject technology.

FIG. 2 illustrates a cross-sectional view of one example of a drill bit 200 having a processor 250 processing pressure waves received at the drill bit 200 via either onboard downhole sensors 255 such as accelerometers or gyroscopes in accordance with the present disclosure. The drill bit 200 can include a body 208 having a plurality of blades 210 extending radially from a central portion of the body 208. The plurality of blades 210 can be integrally formed in and part of the body 208. Respective flow paths 224 can be disposed between adjacent blades 210.

A proximal end of the drill bit 200 can include a plurality of cutters 218 operable to engage downhole formation materials and remove such materials to, for example, form a wellbore and the like. Each cutter 118 can be disposed in respective cutter pockets 216 formed on an exterior portion of respective blade 210. Each cutter 218 can include respective cutting surfaces formed from hard materials for engaging and removing adjacent formation materials. Cutters 218 may remove formation materials from the bottom and/or sides of a wellbore while the drill bit 200 rotates.

One or more nozzle openings 220 can be formed in exterior portions of the body 208. Various types of drilling fluid may be pumped from surface drilling equipment through a drill string connected to the drill bit 200. The drill bit 200 may be connected to the drill string by a threaded pin 204 of a shank 206. One or more fluid channels can be formed in the body 208 so that drilling fluid can pump in from the drill string and to the nozzle opening 220.

Figure 3:
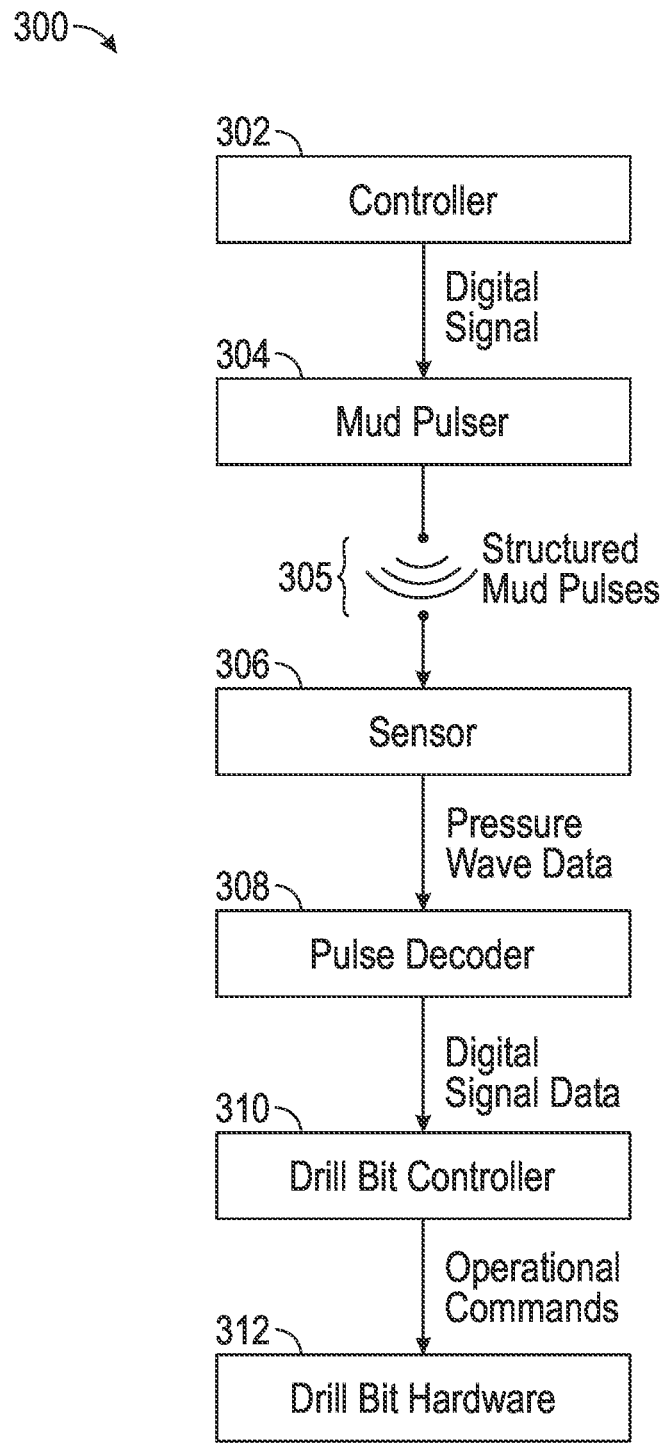
FIG. 3 is a block diagram of a system for communicating with a downhole tool, according to various embodiments of the subject technology.

FIG. 3 illustrates a block diagram of a downhole communication system 300 for enabling an upstring controller at the surface and/or a downhole controller to transmit commands to a downhole device, such as a drill bit, via mud pulses rather than or in addition to transmitting commands through a wire configuration or by specialized wireless transmitter arrays installed along the drill string. The system 300 described below can be carried out using the configurations illustrated in FIGS. 1-2, for example, and various elements of these figures are referenced in explaining example system 300.

A controller 302 can be configured to transmit a digital signal containing information, such as data or command instructions, to a downhole mud pulser 304. The controller 302 may be at the surface or in a downhole device, such as a LWD or MWD logging instruments. The controller 302 can include various interfaces for user interaction and may be connected to the mud pulser 304 by wire, wireless (including mud pulse, or acoustic waves, electromagnetic waves), or any other communicative linkage as will be apparent to a person having ordinary skill in the art. The mud pulser 304 may have a receiver for receiving a digital signal via, such as via wire, from the controller 302, or for decoding mud pulse, acoustic waves, or wireless waves from the controller 302 into a digital signal. The controller 302 also includes software or other executable instructions for generating a mud pulse sequence to be executed by the mud pulser 304. The digital signal includes intensities and timings at which the mud pulser 304 may generate pressure waves via mud pulse for downhole communication.

As a result, the mud pulser 304 generates structured mud pulses 305 which traverse the drilling fluid, fluid within the borehole, and/or formation medium material, downhole so that a sensor 306 may receive, directly or indirectly, the pressure waves of the structured mud pulses 305. In some examples, the sensor 306 includes a pressure transducer for directly measuring the received pressure waves. In some examples, the sensor 306 can include accelerometers, magnetometers, gyroscopes, and/or other sensing tools for indirect measurement of the pressure waves via the physical changes induced in a downhole device, such as changes in rotational characteristics including rate, speed, acceleration, torque, and the like.

The sensor 306 can provide the received pressure wave data to a pulse decoder 308. The pulse decoder 308 can include noise reduction processing as well decoding algorithms stored as executable instructions in a computer-readable medium for extracting digital signal data embedded in the received pressure wave data. For example, and without imputing limitation, a low-pass filter can be used to eliminate some portion of noise in the pressure wave data. The low-pass filter can be combined with, for example, Hamming codes or other error correcting algorithms, to further reduce noise in the signal or extract a true signal from the received pressure wave data. Further, the extracted signal can be processed according to various decoding processes such as, for example and without imputing limitation, Barker codes and the like having mapped instruction sets stored by either the pulse decoder 308 or a drill bit controller 310 receiving the digital signal data from the pulse decode 308.

The drill bit controller 310 includes drivers and other controls software for steering, retrieving data from, and otherwise operating drill bit hardware 312. The drill bit controller 310 may execute instructions embedded within the digital signal data by providing operational commands to the drill bit hardware 312. The drill bit hardware 312 can include multiple components as will be understood by a person having ordinary skill in the art. For example, the drill bit hardware 312 may include one or more motors for rotating cutters 118 (shown in FIG. 1), one or more motors for rotating the drill bit 200, one or more motors for manipulating each or all of the plurality of blades 210, hardware controls for opening, closing, and otherwise operating the nozzle opening 220 (shown in FIG. 2), and other components for drilling as will be apparent to a person having ordinary skill in the art. As a result, control signals from the controller 302 can directly guide operation of the drill bit hardware 512 without requiring additional hardware to be installed on the drill string 108 such as wireless communications devices or wiring passing around or through the mud pulser 304.

Figure 4:
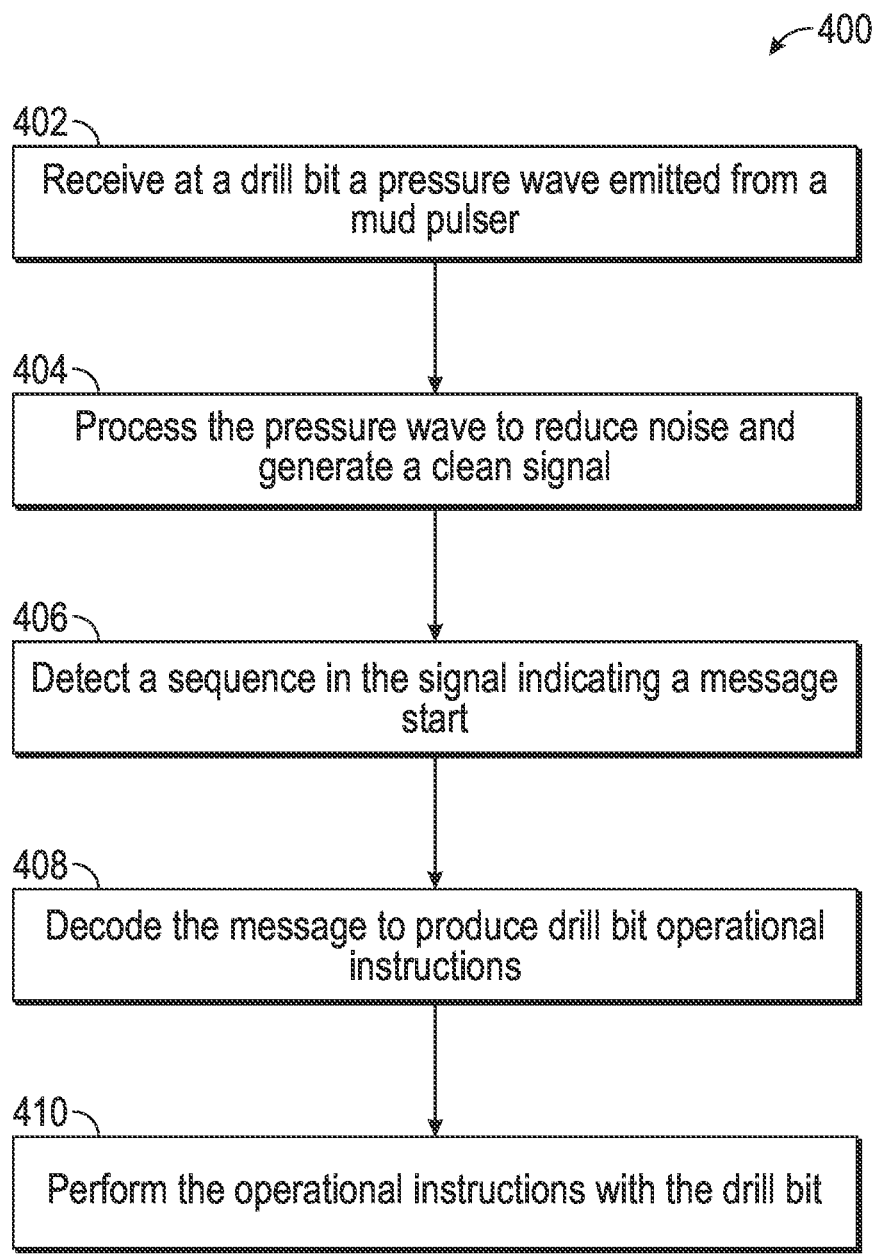
FIG. 4 is a flowchart of a method for communicating with a downhole tool, according various embodiments of the subject technology.

FIG. 4 is a flowchart for a method 400 to communicate downhole with a drill bit such as, or substantially similar to, the drill bit 200 discussed above. The method 400 described below can be carried out using the configurations illustrated in FIGS. 1-2, for example, and various elements of these figures are referenced in explaining example method 400. Each block shown in FIG. 4 represents one or more processes, methods or subroutines, carried out in the example method 400. Additionally, method 400 can be, for example, stored as instructions in a memory or other non-transitory computer-readable medium for execution by one or more hardware processors. In some examples, the drill bit may include an onboard processor and memory to store and execute the instructions.

At step 402, a drill bit receives a pressure wave emitted from a mud pulser. The mud pulser transmits the pressure wave according to a sequence mapped to a digital signal received by the mud pulser from, for example, a control terminal at a surface rig installation or the like and transmitted via wireline. The drill bit can detect and measure the pressure wave directly through onboard or linked transducers, or may detect and/or measure the pressure wave indirectly by means of gyroscopes, magnetometers, accelerometers, and various other sensors for detecting a rotational characteristic of the drill bit as it rotates. In some examples, multiple sensors, such as a gyroscope and magnetometer, can detect and measure the pressure wave simultaneously in order to increase measurement accuracy. In some examples, different sensors can detect and measure the pressure wave based on location and/or orientation of the drill bit, such as to account for orientation of the drill bit relative to the mud pulser.

At step 404, the received pressure wave is processed to reduce noise and generate a clean signal for downstream use. For example, a low-pass filter can be applied to reduce signal noise and Hamming codes can be applied to correct for any errors related to noise or noise processing. The cleaned signal can then be used downstream at further steps.

At step 406, a sequence in the signal is detected indicating a message is being transmitted. For example, a specific pulse sequence can be used which is unlikely to occur unintentionally but which nevertheless can be decoded from a clean signal to indicate a data packet is being transmitted. In some examples, the sequence can be a certain number of rapid pulses followed by a specific delay and then followed by a certain number of synchronization pulses. Where the wrong number of synchronization pulses is detected or an insufficient amount of (or too much) time occurs, the drill bit may revert to awaiting for the initiating pulse sequence before attempting to decode a packet from a signal again.

At step 408, operational instructions are decoded from the indicated message. In some examples, Barker codes are used to map a select instruction set to particular sequences, such as following the detected message start sequence discussed above at operation 406). Nevertheless, at step 410, the operational instructions are performed by the drill bit. The operational instructions may be provided to a driver or other controller software of a processor and memory of the drill bit for controlling the various hardware components of the drill bit, for instance blades and nozzles, according to the signal encoded in the received pressure wave and, in some examples, transmitted from a control or steering station at the surface level and the like.

Figure 5:
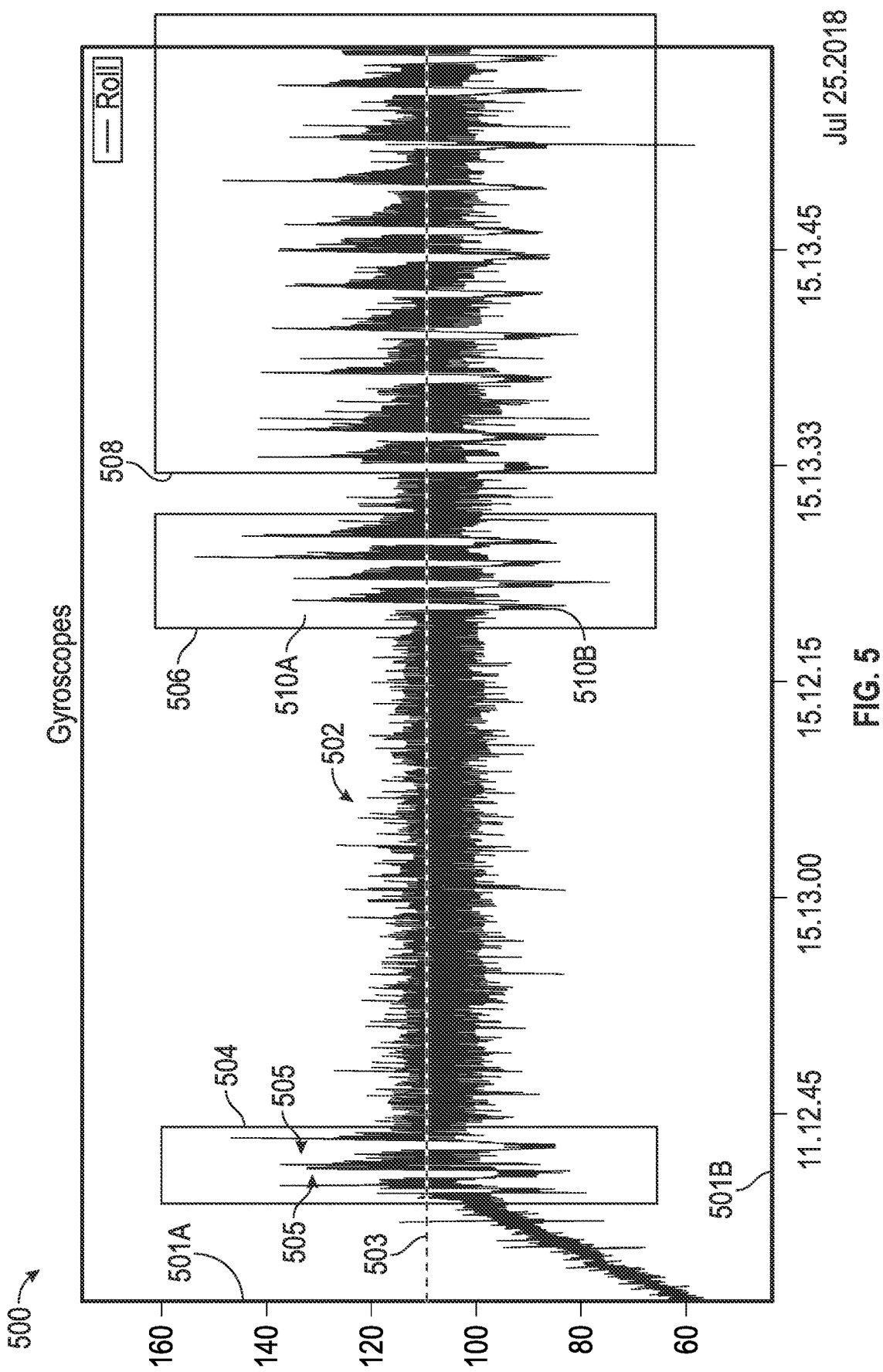
FIG. 5 is a graph of received downhole signals, according to various embodiments of the subject technology.

FIG. 5 is a graph 500 depicting encoded pressure waves providing a control instruction for a drill bit. In particular, graph 500 depicts, from a drill bit perspective and sensing via an onboard gyroscope, a received and processed pressure wave having an encoded data packet. Graph 500 captures a gyroscope roll speed 501A over a time axis 501B and so pulses can be observed in the form of brief deviations from a baseline 503 roll speed, here around 105 rotations per second. A window of deviation is expected; however, where an external force such as a pressure wave interacts with the gyroscope, an abnormally large deviation can be observed and thus mapped to a pressure wave or mud pulse.

A power up sequence 504 includes two initial pulses 505 and indicates one part of a sequence indicating an incoming data packet. A timed gap 502, here 30 seconds, follows the power up sequence 504. Within the timed gap 502, expected deviations occur, however there is notably little observable structure as any deviations are a result of environmental noise and the like.

After approximately 30 seconds, a pulse sequence 506 including four "sync" pulses are received. As can be seen, the sync pulses cause the roll measurement of the gyroscope to greatly exceed the baseline, such as at measurement 510A, and correspondingly fall below the baseline, such as at measurement 510B.

Following the sync pulse sequence 506, normal data 508 is received in the form of structured pulses. Based on the timing and number of the pulses of the normal data packet, operational instructions and the like can be determined for issuing to hardware controllers within a drill bit. In effect, wireless control of a drill bit can be achieved using onboard hardware and software and without necessitating additional hardware units placed on a drill string or complicated additional wiring to circumscribe a mud pulser.

Figure 6:
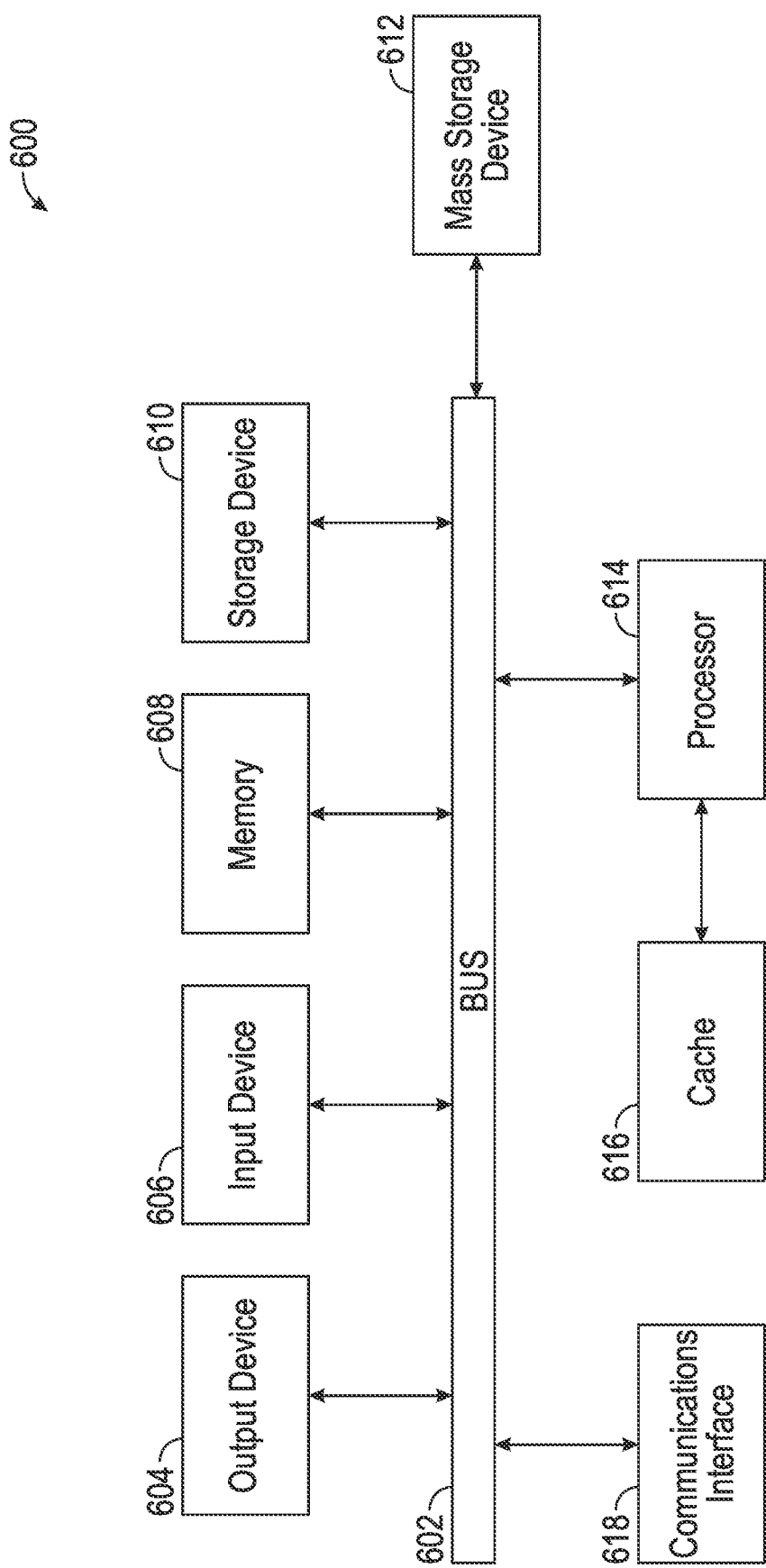
FIG. 6 is a computing system, according to various embodiments of the subject technology.

FIG. 6 an example computing system 600 that may implement various systems and methods discussed herein. The computer system 600 includes one or more computing components in communication via a bus 602. In one implementation, the computing system 600 includes one or more processors 614. The processor 614 can include one or more internal levels of cache 616 and a bus controller or bus interface unit to direct interaction with the bus 602. The processor 614 can include, for example, the drill bit controller 310 and pulse decoder 308 and specifically implements the various methods discussed herein. Main memory 608 may include one or more memory cards and a control circuit (not depicted), or other forms of removable memory, and may store various software applications including computer executable instructions, that when run on the processor 614, implement the methods and systems set out herein. Other forms of memory, such as a storage device 610 and a mass storage device 612, may also be included and accessible, by the processor (or processors) 614 via the bus 602. The storage device 610 and mass storage device 612 can each contain executable instructions for implementing any or all of the aforementioned systems and methods. In some example, storage device 610 or mass storage device 612 may include logs from sensor feeds and the like, such as sensor 306, which may be accessed via bus 602.

The computer system 600 can further include a communications interface 618 by way of which the computer system 600 can connect to networks or other devices. The computer system 600 can include an output device 604 by which information can be displayed or transmitted, for instance after the drill bit 114 is retrieved from the wellbore 128. The computer system 600 can also include an input device 606 by which information, such as data from sensor 306 or driver updates, may be input. Input device 606 can be a port, control console, and/or other input devices as will be apparent to a person of ordinary skill in the art. The system set forth in FIG. 6 is but one possible example of a computer system that may employ or be configured in accordance with aspects of the present disclosure. It will be appreciated that other non-transitory tangible computer-readable storage media storing computer-executable instructions for implementing the presently disclosed technology on a computing system may be utilized.

In the present disclosure, the methods disclosed may be implemented, in whole or in part, as one or more sets of instructions or software readable by a device. Further, it is understood that the specific order or hierarchy of steps in the methods disclosed are instances of example approaches. Based upon design preferences, it is understood that the specific order or hierarchy of steps in the methods can be rearranged while remaining within the disclosed subject matter. The accompanying method claims present elements of the various steps in a sample order, and are not necessarily meant to be limited to the specific order or hierarchy presented.

Parts of the described disclosure may be provided as a computer program product, or software, that may include a computer-readable storage medium having stored thereon instructions, which may be used to program a computer system (or other electronic devices) to perform a process according to the present disclosure. A computer-readable storage medium includes any mechanism for storing information in a form readable by a computer, including software or a processing application). The computer-readable storage medium may include, but is not limited to, optical storage medium including a CD-ROM, magneto-optical storage medium, read only memory (ROM), random access memory (RAM), erasable programmable memory including EPROM and EEPROM, flash memory, or other types of medium suitable for storing electronic instructions.

The description above includes example systems, methods, techniques, instruction sequences, and/or computer program products that embody techniques of the present disclosure. However, it is understood that the described disclosure may be practiced without these specific details.

While the present disclosure has been described with references to various implementations, it will be understood that these implementations are illustrative and that the scope of the disclosure is not limited to them. Many variations, modifications, additions, and improvements are possible. More generally, implementations in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

Numerous examples are provided herein to enhance understanding of the present disclosure. A specific set of statements are provided as follows.

Statement 1: A method comprising: detecting, by a downhole sensor coupled with a downhole tool disposed in a wellbore, a pressure wave at a downhole tool, the pressure wave being generated by a mud pulser and comprising information; and converting, by a processor coupled with a downhole tool, the pressure wave into a digital signal comprising the information.

Statement 2: The method of Statement 1, where the downhole tool is a drilling device having a drill string and a drill bit.

Statement 3: The method of Statement 1 or 2 wherein the downhole sensor is located below the motor of the drilling device.

Statement 4: The method of any one of the preceding Statements 1-3, wherein the mud pulser is within the wellbore.

Statement 5: The method of any one of the preceding Statements 1-4, wherein the downhole sensor indirectly detects the pressure wave by detecting physical changes induced in a portion of the downhole tool by the pressure wave, and converting comprises converting the detected physical changes into the digital signal.

Statement 6: The method of any one of the preceding Statements 1-5, wherein the physical changes induced by the pressure wave comprises at least one selected from the group of change in the rotation of a drill bit, a change in a flow rate of a fluid in the downhole tool, a change in a speed of a motor in the downhole tool, and a change in the torque of the motor in the downhole tool.

Statement 7: The method of any one of the preceding Statements 1-6, wherein the downhole sensor comprising at least one selected from the group of a gyroscope, a magnetometer, a torque sensor, and an accelerometer.

Statement 8: The method of any one of the preceding Statements 1-7, wherein the downhole sensor comprises a gyroscope.

Statement 9: The method of any one of the preceding Statements 1-8, wherein detecting the pressure wave comprises detecting changes in a rotational characteristic of a drill bit.

Statement 10: The method of any one of the preceding Statements 1-9, wherein the downhole sensor detects the pressure wave directly with a transducer.

Statement 11: The method of any one of the preceding Statements 1-10, wherein the downhole tool is a drilling device having a drill string, a motor and a drill bit, wherein the motor is located above the drill bit and powers rotation of the drill bit, and wherein the transducer is located below the motor.

Statement 12: The method of any one of the preceding Statements 1-11, wherein the information comprises instructions executable by the downhole tool; and operating, by the processor, the downhole tool by executing the instructions.

Statement 13: The method of any one of the preceding Statements 1-12, wherein converting the pressure wave further comprises: removing, by the processor, noise from the pressure wave to produce a cleaned digital signal comprising the information.

Statement 14: The method of any one of the preceding Statements 1-13, wherein the mud pulser is at a surface of the earth.

Statement 15: A system for communicating with a downhole tool, the system comprising: a downhole sensor disposed within a wellbore coupled with a downhole tool, the downhole sensor configured to detect a pressure wave generated by a mud pulser; and a processor coupled with a downhole tool configured to convert the pressure wave into a digital signal comprising the information.

Statement 16: The system of Statement 15, wherein the downhole sensor is configured to indirectly detect the pressure wave by detecting physical changes induced in a portion of the downhole tool by the pressure wave.

Statement 17: The system of Statement 15 or 16, wherein the change induced by the pressure wave comprises at least one selected from the group of change in the rotation of a drill bit, a change in a flow rate of a fluid in the downhole tool, a change in a speed of a motor in the downhole tool, and a change in the torque of the motor in the downhole tool.

Statement 18: The system of any one of the preceding Statements 15-17, wherein the downhole sensor comprising at least one selected from the group of a gyroscope, a magnetometer, a torque sensor, and an accelerometer.

Statement 19: A non-transitory computer-readable medium coupled with a downhole tool comprising instructions that, when executed by a processor, cause the processor to: detect, via a downhole sensor disposed within a wellbore coupled with a downhole tool, a pressure wave generated by a mud pulser, the pressure wave comprising information; and convert the pressure wave into a digital signal comprising the information.

Statement 20: The non-transitory computer-readable medium of Statement 19, wherein the downhole sensor is configured to indirectly detect the pressure wave by detecting physical changes induced in a portion of the downhole tool by the pressure wave.

What is claimed is:

1. A method comprising:
    detecting, by a downhole sensor coupled with a downhole tool disposed in a wellbore, a pressure wave by measuring physical changes associated with the downhole tool, wherein the physical changes include at least one of a change in rotation of a drill bit, a change in a flow rate of a fluid in the downhole tool, a change in a speed of a motor in the downhole tool, and a change in the torque of the motor in the downhole tool, and wherein the physical changes are induced by a pressure wave from a mud pulser; and
    converting, by a processor coupled with the downhole tool, data representing the physical changes into a digital signal comprising information representing the pressure wave.

2. The method of claim 1, where the downhole tool is a drilling device having a drill string and a drill bit.

3. The method of claim 2, wherein the downhole sensor is located below the motor of the drilling device.

4. The method of claim 1, wherein the mud pulser is within the wellbore.

5. The method of claim 1, wherein the downhole sensor comprising at least one selected from the group of a gyroscope, a magnetometer, a torque sensor, and an accelerometer.

6. The method of claim 5, wherein the downhole sensor comprises a gyroscope.

7. The method of claim 6, wherein detecting the pressure wave comprises detecting changes in a rotational characteristic of a drill bit.

8. The method of claim 1, wherein the downhole sensor detects the pressure wave directly with a transducer.

9. The method of claim 8,
wherein the downhole tool is a drilling device having a drill string, the motor and the drill bit, wherein the motor is located above the drill bit and powers rotation of the drill bit, and
wherein the transducer is located below the motor.

10. The method of claim 1,
wherein the information comprises instructions executable by the downhole tool; and
operating, by the processor, the downhole tool by executing the instructions.

11. The method of claim 1, wherein converting the pressure wave further comprises:
removing, by the processor, noise from the pressure wave to produce a cleaned digital signal comprising the information.

12. The method of claim 1, wherein the mud pulser is at a surface of the earth.

13. A system for communicating with a downhole tool, the system comprising:
a downhole sensor disposed within a wellbore coupled with the downhole tool, the downhole sensor configured to detect physical changes comprises at least one selected from the group of change in the rotation of a drill bit, a change in a flow rate of a fluid in the downhole tool, a change in a speed of a motor in the downhole tool, and a change in the torque of the motor in the downhole tool being induced by a pressure wave generated by a mud pulser, and the downhole sensor indirectly detects the pressure wave by detecting the physical changes induced in a portion of the downhole tool by the pressure wave; and
a processor coupled with the downhole tool configured to convert the physical changes into a digital signal comprising the information.

14. The system of claim 13, wherein the downhole sensor comprising at least one selected from the group of a gyroscope, a magnetometer, a torque sensor, and an accelerometer.

15. A non-transitory computer-readable medium coupled with a downhole tool comprising instructions that, when executed by a processor, cause the processor to:
detect, via a downhole sensor disposed within a wellbore coupled with the downhole tool, physical changes by a pressure wave induced by a mud pulser, the downhole sensor indirectly detects the pressure wave by detecting the physical changes comprising at least one selected from the group of change in the rotation of a drill bit, a change in a flow rate of a fluid in the downhole tool, a change in a speed of a motor in the downhole tool, and a change in the torque of the motor in the downhole tool induced in a portion of the downhole tool by the pressure wave, the physical changes comprising information; and
convert the physical changes into a digital signal comprising the information.

* * * * *